United States Patent
Lin et al.

(10) Patent No.: US 11,232,052 B2
(45) Date of Patent: Jan. 25, 2022

(54) TIMING CONTROL METHOD AND SYSTEM APPLIED ON THE NETWORK SIMULATOR PLATFORM

(71) Applicant: ESTINET TECHNOLOGIES INCORPORATION, Hsinchu (TW)

(72) Inventors: Chih-Che Lin, Hsinchu (TW); Ting-Wei Ho, Hsinchu (TW)

(73) Assignee: Estinet Technologies Incorporation, Hsinchu (TW)

( * ) Notice: Subject to any disclaimer, the term of this patent is extended or adjusted under 35 U.S.C. 154(b) by 211 days.

(21) Appl. No.: 16/738,173

(22) Filed: Jan. 9, 2020

(65) Prior Publication Data

US 2021/0026790 A1    Jan. 28, 2021

(30) Foreign Application Priority Data

Jul. 22, 2019    (TW) .................................. 108125869

(51) Int. Cl.
  *G06F 13/20*    (2006.01)
  *G06F 1/14*    (2006.01)

(52) U.S. Cl.
  CPC ................ *G06F 13/20* (2013.01); *G06F 1/14* (2013.01); *G06F 2213/2406* (2013.01)

(58) Field of Classification Search
  CPC ...................................................... G06F 13/20
  USPC .......................................................... 710/58
  See application file for complete search history.

(56) References Cited

U.S. PATENT DOCUMENTS

| | | | | |
|---|---|---|---|---|
| 6,108,309 A | * | 8/2000 | Cohoe ................... | H04L 41/145 370/241 |
| 6,134,516 A | * | 10/2000 | Wang .................... | G06F 30/331 703/27 |
| 6,785,873 B1 | * | 8/2004 | Tseng ..................... | G06F 30/33 716/102 |
| 2003/0023791 A1 | * | 1/2003 | Suzuki .................. | G06F 13/105 710/62 |
| 2004/0103221 A1 | * | 5/2004 | Rosu ....................... | G06F 9/544 710/1 |
| 2004/0260993 A1 | * | 12/2004 | Griffin ................ | G06F 11/3433 714/743 |
| 2012/0159477 A1 | * | 6/2012 | Veresov .............. | G06F 9/45504 718/1 |

\* cited by examiner

*Primary Examiner* — Titus Wong
(74) *Attorney, Agent, or Firm* — Rosenberg, Klein & Lee (57) ABSTRACT

A timing control method and system applied on the network simulator platform are disclosed. When at least one subprocess calls a system call to enter a blocking I/O, a marking operation is performed, the kernel issues a first notification event to a network simulator, to request the network simulator to pause until the subprocess leaves from the blocking I/O. when the kernel detects that the subprocess leaves from the blocking I/O already, the kernel issues a second notification event to the network simulator, so that the network simulator continues to simulate. The present invention can control the subprocess to not continuously occupy resource, and first and second notification events can prevent a simulator timer from continuously running during the subprocess execution period, to cause an abnormal timing of a simulation result.

16 Claims, 8 Drawing Sheets

TIMING CONTROL METHOD AND SYSTEM APPLIED ON THE NETWORK SIMULATOR PLATFORM

This application claims priority for Taiwan patent application no. 108125869 filed on Jul. 22, 2019, the content of which is incorporated by reference in its entirely.

BACKGROUND OF THE INVENTION

1. Field of the Invention

The present invention relates to a network simulator, more particularly to a timing control method and system applied on a network simulator platform.

2. Description of the Related Art

Figure 1:
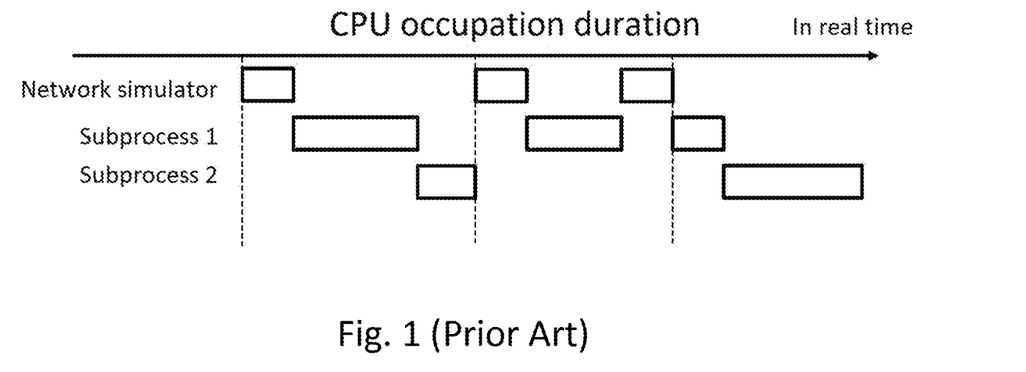
FIG. 1 is a schematic view showing a timing of a simulator and a subprocess of the simulator which occupy a central processing unit by turns in prior art.

In order to ensure repeatability of a simulation result, operations of a simulator engine process of a network simulator and a node program to be simulated, which is a subprocess of the network simulator, can share the same central processing unit, so as to keep serialization of a simulation event. As shown in FIG. 1, a simulator, a subprocess 1 and a subprocess 2 can occupy resource of the central processing unit by turns, and each subprocesses is a real-time process and has a higher priority to use the central processing to continuously execute until the subprocess actively releases the central processing unit by itself. Therefore, when the subprocess 1 wants to use the central processing unit, the simulator releases the central processing unit to execute the subprocess 1, and the subprocess 2 is then executed after execution of the subprocess 1 is completed. After the subprocess 1 or the subprocess 2 is executed completely, it turns to the simulator, and the simulator controls a virtual time to jump to next timer event for execution.

Figure 2A:
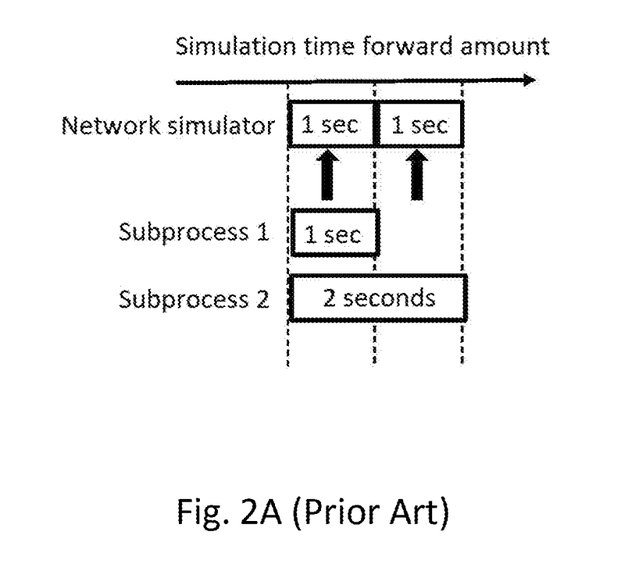
FIG. 2A is a schematic view showing a normal status of a time shift simulation amount in prior art.
Figure 2B:
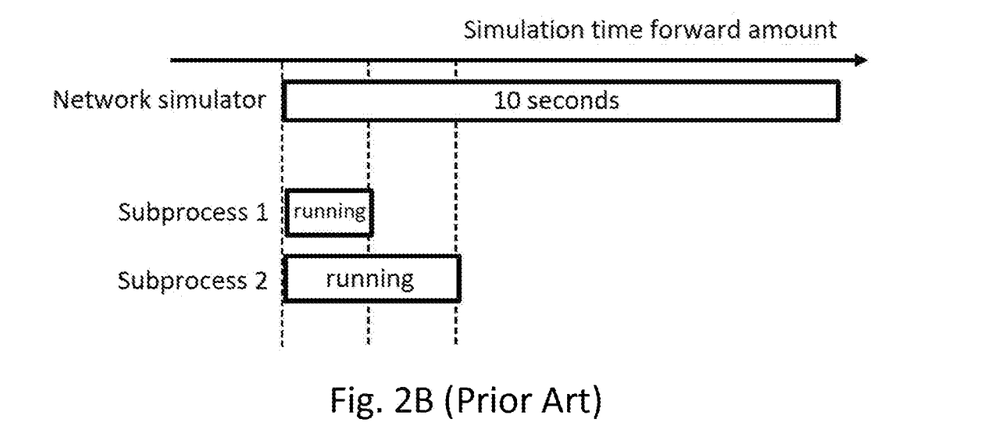
FIG. 2B is a schematic view showing an abnormal status in which the subprocess does not generate a timer event in prior art.
Figure 3A:
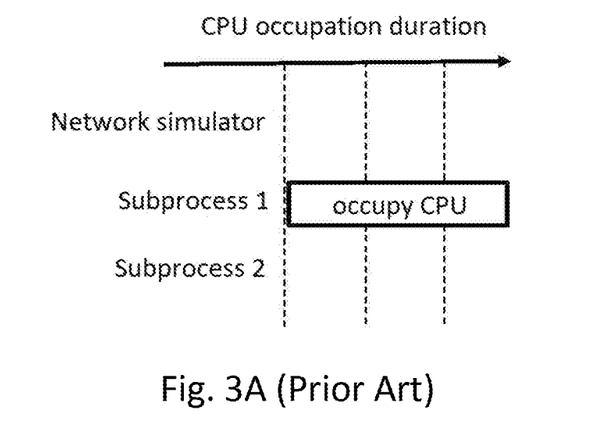
FIG. 3A is a schematic view showing that a central processing unit is occupied by a subprocess in prior art.
Figure 3B:
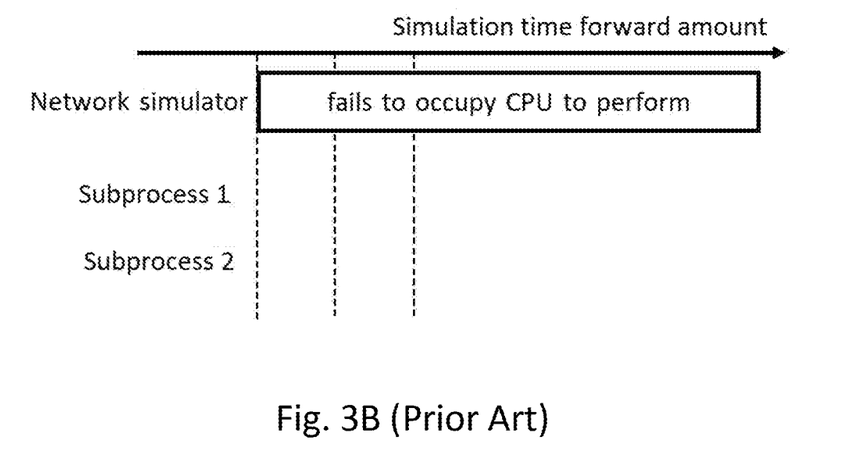
FIG. 3B is a schematic view showing a time shift simulation amount of a central processing unit when the central processing unit is continuously occupied by a subprocess in prior art.

The simulation time forward amount of event-based simulation is not a constant value, and, in most cases, a simulation speed of the event-based simulation is faster than that of the general polling-based simulation. However, when following condition such as a first condition shown in FIGS. 2A and 2B occurs, it causes failure of the simulator to correctly control the virtual time. FIG. 2A shows a normal simulation timing diagram. Because of interconnection delay, propagation delay, timer event and so on, the event generated by the subprocess may cause time to shift forwardly after being transmitted over network, and according to sorted time shift amount of all events, the timer selects and executes the event, which has the minimal time shift and closest to the current simulation time, and shifts time forwardly; however, when the subprocess releases the central processing unit but does not generate the timer event, for example, the subprocess does not call an I/O system call, the subprocess will sleep in the system call function of the operating system, and a kernel of the operating system will release resource, occupied by the subprocess, of the central processing unit; at the same time, since the resource release is not caused by network interconnecting transmission event, the subprocess does not generate a timer event of forwardly shifting time to the simulator. As a result, the simulator determines that there is no event to be executed and then forwardly shifts the virtual time quickly, as shown in FIG. 2B. FIGS. 3A and 3B shows a second condition. As shown in FIG. 3A, when the subprocess 1 continuously occupies and does not release the central processing unit, for example, the subprocess continuously calls the system call, or the subprocess is a CPU-bound process, or the subprocess executes an empty busy loop, the simulator fails to obtain the resource of the processor for execution, and it causes failure of the virtual time to forwardly shift, as shown in FIG. 3B.

Therefore, the present invention provides a timing control method and system applied on the network simulator platform, to effectively solve the aforementioned problems. The specific architectures and embodiments of the timing control method and system of the present invention will be described in detail in following paragraphs.

SUMMARY OF THE INVENTION

An objective of the present invention is to provide a timing control method and system applied on a network simulator platform, and a kernel can be used to issue a notification event to inform a simulator about a status of a subprocess, for example, inform the simulator that the subprocess enters a blocking I/O, so that the simulator stops executing a simulator timer, and the simulator continues to execute the simulator timer after the subprocess leaves the blocking I/O, thereby solving the problem that a virtual time forwardly shifts quickly because the simulator determines that there is no event to be executed when the subprocess does not generate a timer event.

Another objective of the present invention is to provide a timing control method and system applied on the network simulator platform, and when the kernel detects that the subprocess continuously occupies resource of a central processing unit, the kernel notifies the simulator, and the simulator determines when to force the subprocess to release the resource, so as to solve the problem that the virtual time fails to forwardly shift because the simulator fails to execute.

Another objective of the present invention is to provide a timing control method and system applied on the network simulator platform, and the subprocess entering the blocking I/O is marked, so that the kernel can detect the status of the subprocess and notify the simulator to pause.

In order to achieve the objectives, the present invention provides a timing control method applied on a network simulator platform, a network simulator is installed in a computer and configured to simulate at least one target software, and the timing control method comprises following steps. When at least one subprocess wants to call a first system call to enter a blocking I/O, a marking operation is performed; when detecting the blocking I/O, the kernel issues a first notification event to the running network simulator, to inform the network simulator that a status of the at least one subprocess is changed, so to request the network simulator to pause, and after all of the at least one subprocess entering the blocking I/O leaves from the blocking I/O already, the kernel issues a second notification event to the network simulator, so that the network simulator continues to operate.

According to an embodiment of the present invention, timing control method further comprises a step of building a task list managed by the kernel and configured to mark the subprocess entering the blocking I/O.

According to above-mentioned content, a condition field of the task list is marked by a fourth system call, the fourth system call belongs to a blocking I/O class or a Unix domain socket class, and the blocking I/O class comprises system calls having a function of opening file, reading file, writing file or obtaining a file status (which is also called as fstat), or having a synchronization function.

According to an embodiment of the present invention, the timing control method comprises a step of building a task list which is detected by the kernel to determine whether there is any subprocess continuously occupying the resource of the central processing unit; when detecting that there is at least one subprocess continuously occupying the resource of the central processing unit, the kernel generates a third notification event to the network simulator, so that the network simulator determines when to force the at least one subprocess to release the resource; further, the network simulator can output a second system call, to make the kernel force the at least one subprocess, which occupies the resource, to release the resource of the central processing unit.

In order to achieve the objectives, the present invention provides a timing control system applied on a network simulator platform, and the timing control system comprises a network simulator, at least one subprocess, and a kernel. The network simulator is installed in a computer and configured to simulate at least one target software. When the at least one subprocess and the network simulator use the same resource, and the at least one subprocess call the first system call to enter a blocking I/O, a marking operation is performed. When detecting that at least one subprocess calls the system call to enter the blocking I/O and the at least one subprocess enters the blocking I/O, the kernel issues a first notification event to inform the running network simulator that a status of the at least one subprocess is changed, and request the network simulator to pause, and when detecting that all of the at least one subprocess leaves the blocking I/O already, the kernel issues a second notification event to the network simulator, so that the network simulator continues to operate.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise", "include" and "have", and variations such as "comprises", "comprising", "includes", "including", "has" and "having" will be acknowledged to imply the inclusion of stated elements but not the exclusion of any other elements.

The present invention provides a timing control method and system applied on a network simulator platform. When at least one subprocess of a network simulator and the network simulator use the same resource, the subprocess has a higher priority to use resource, so the network simulator continues to perform simulation only when the subprocess is executed completely. However, when the subprocess releases the resource but does not generate a timer event, the simulator determines that there is no event to be executed, and it causes a virtual time to forwardly shift quickly, and an abnormal simulation duration occurs. Therefore, in the timing control method and system of the present invention, the subprocess can generate a message to inform the kernel that the subprocess starts to execute or the subprocess is executed completely, and the kernel can notify the simulator, so as to solve the above-mentioned problem. Embodiments of the technical solution of the present invention will be described with reference to FIGS. 4A to 4C, which are flowcharts of a timing control method applied on the network simulator platform, according to the present invention, and with reference to FIG. 5, which is a flowchart of the timing control method of the present invention.

Figure 4A:
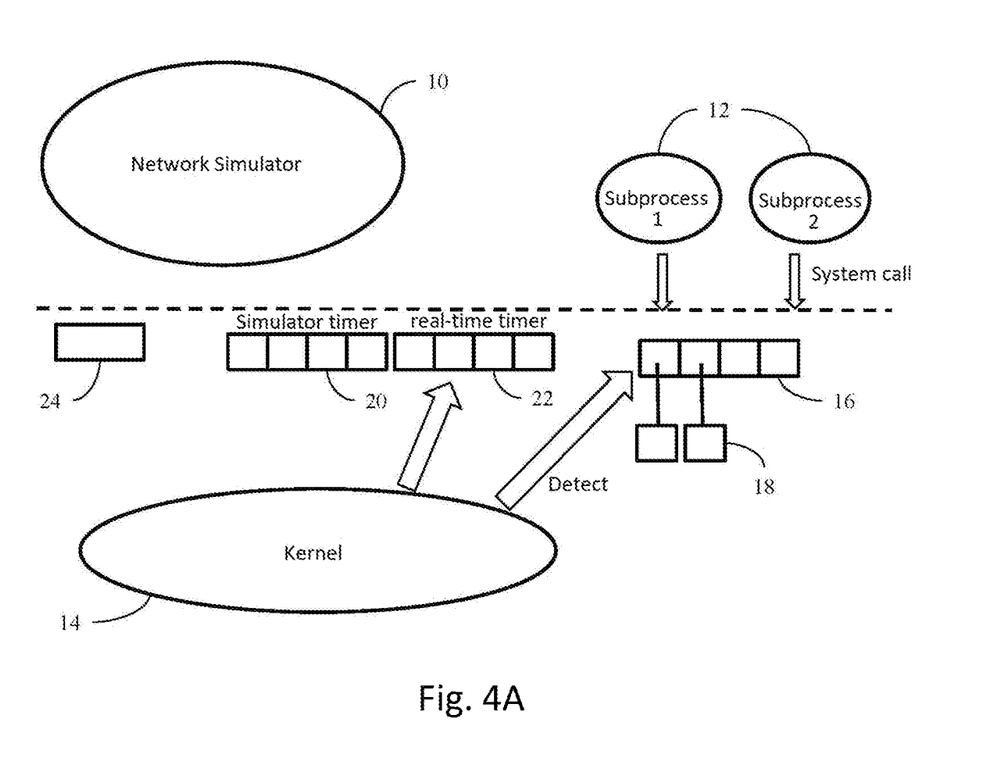
FIGS. 4A to 4C are flowcharts of a timing control method applied on a network simulator platform, according to the present invention.
Figure 5:
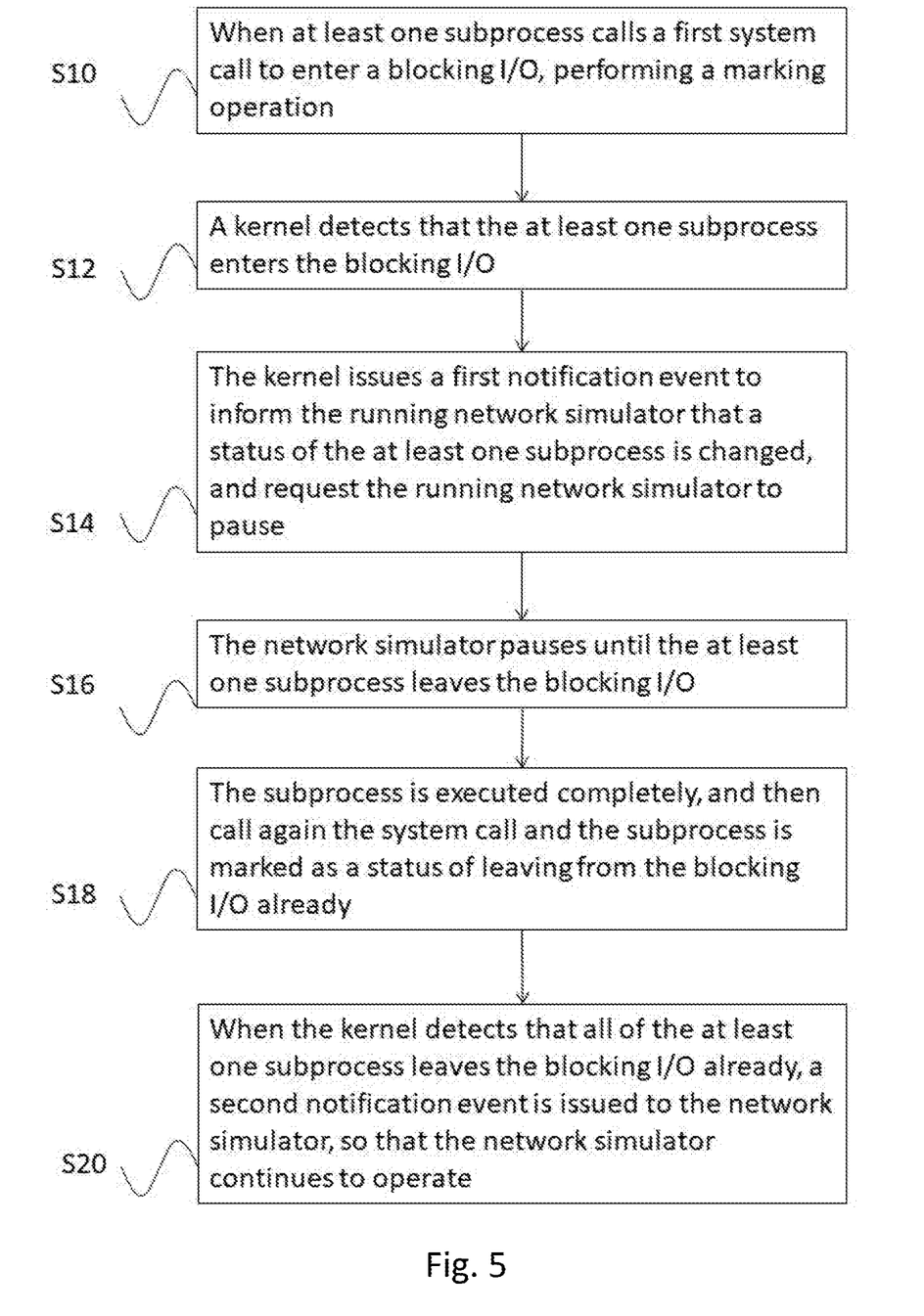
FIG. 5 is a flowchart showing a timing control method applied on a network simulator platform, according to the present invention.

As shown in FIG. 4A, the architecture of the present invention includes a network simulator 10, at least one subprocess 12 and a kernel 14. The network simulator 10 is installed in a computer and configured to simulate at least one target software. In a step S10, when the network simulator 10 is running and the subprocess 12 calls a first system call to enter the blocking I/O, a marking operation is performed. Next, in a step S12, the kernel 14 detects that the subprocess 12 enters a blocking I/O 18. As shown in FIG. 4A, a real-time timer 22 forwardly shifts time continuously, and any one of the at least one subprocess 12 is a real-time process, and the simulator timer 20 is only used to record timing of the network simulator 10.

Figure 4B:
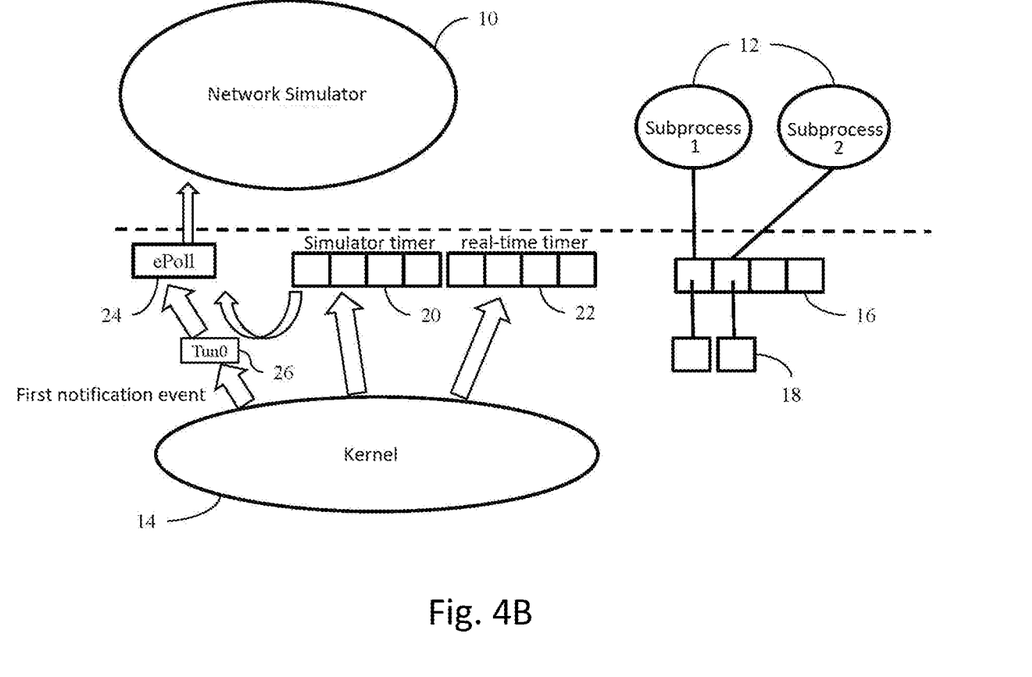

Next, as shown in FIG. 4B, when the kernel 14 detects that there is a subprocess 12 entering the blocking I/O 18, in a step S14 the kernel 14 issues a first notification event to the network simulator 10, to inform the network simulator 10 that a status of the at least one subprocess 12 is changed and request the network simulator 10 to pause. The first notification event is transmitted to the network simulator 10 through an I/O event notification mechanism 24, which is also called as an ePoll mechanism 24. In a step S16, the network simulator 10 pauses until the subprocess 12 leaves from the blocking I/O 18. At this time, when the network simulator 10 pauses, the simulator timer 20 also stops executing, but the time of the real-time timer 22 forwardly shifts continuously. The kernel 14 issues a notification event to the network simulator 10 through a driving device 26, which is also called as Tun0 26; that is, all notification events of the kernel 14 are issued to the Tun0 26, and the network simulator 10 then accesses the Tun0 26 to obtain the event content.

Figure 4C:
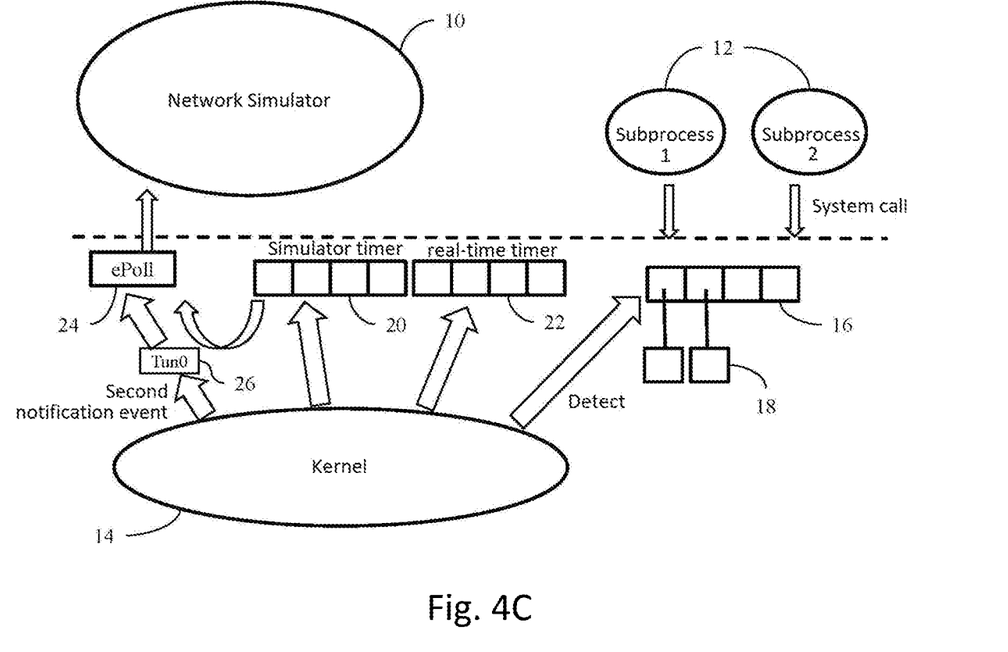

Please refer to FIG. 4C. In a step S18, after the subprocess 12 is executed completely, the subprocess 12 calls again the third system call and the subprocess 12 is marked as a status of leaving from the blocking I/O 18 already. After the kernel 14 detects that all of the at least one subprocess 12 leaves from the blocking I/O 18, the kernel 14 issues a second notification event to the network simulator 10, so that the network simulator 10 continues to operate. The second notification event is also transmitted to the network simulator 10 through the ePoll mechanism 24, so that the simulator timer 20 continues to operate. Therefore, no matter whether the subprocess 12 issues the timer event during execution, the network simulator 10 can know the status of the subprocess 12.

Figure 6:
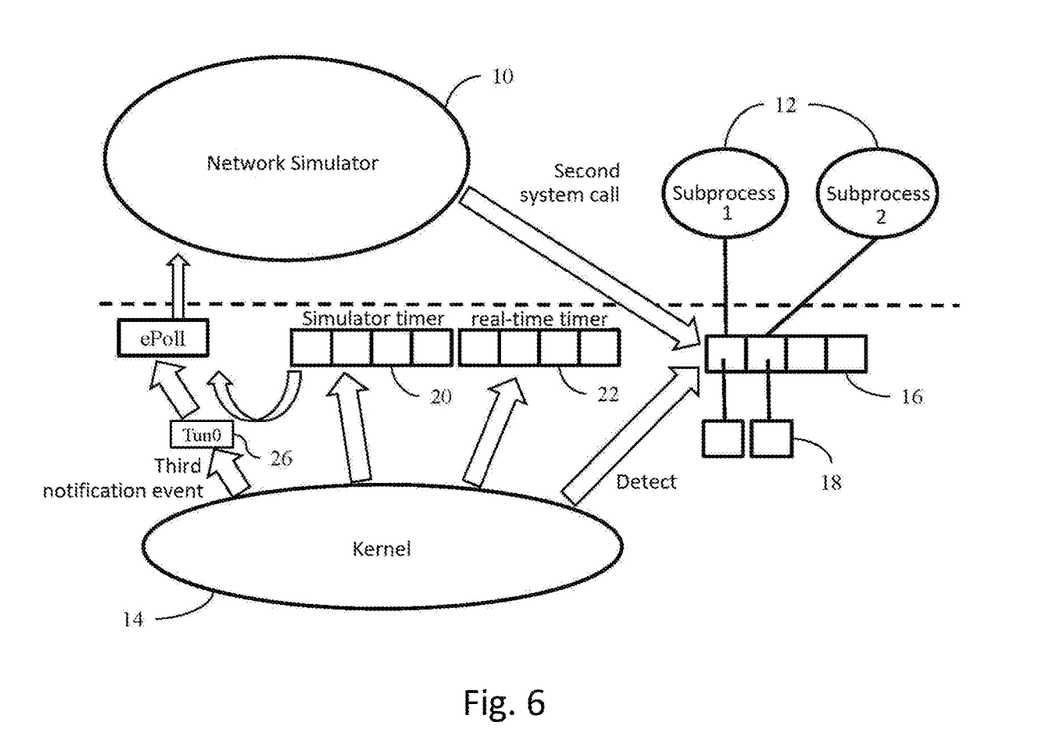
FIG. 6 is a schematic view of an operation of a timing control method, which is applied on a network simulator platform to stop the subprocess continuously occupying resource, according to the present invention.

Furthermore, an embodiment of the present invention can build a task list 16, which is managed by the kernel 14. When the subprocess 12 continuously occupies resource of the central processing unit, the network simulator 10 fails to execute and the virtual time of the simulator timer 20 stops forwardly shifting. Therefore, the present invention provides a method for solving the problem that the subprocess occupies resource continuously. Please refer to FIG. 6. When the subprocess 12 continuously occupies resource of the central processing unit and the kernel 14 detects that the subprocess 12 continuously occupies the central processing unit for more than a predetermined period, the kernel 14 can issue a third notification event to the network simulator 10, so that the network simulator 10 determines when to force the at least one subprocess 12 to release the resource. When the network simulator 10 determines to force the subprocess 12 to release the resource, the network simulator 10 can issue a second system call, to make the kernel 14 force the subprocess 12, which occupies the resource, to release the resource, so that the network simulator 10 can continue to execute.

Furthermore, the task list 16 includes a condition field, which is not shown in figures. The condition field can be used to mark a blocking I/O status of the subprocess 12, for example, in the step S10 of FIG. 5, when the subprocess calls the first system call to enter the blocking I/O, the condition field can be marked that the blocking I/O status of the subprocess 12 is "entered already". The condition field can be marked by a fourth system call, and the fourth system call can belong to a blocking I/O class or a Unix domain socket class. The blocking I/O class comprises the system call having a function of opening file, reading file, writing file, or obtaining fstat, or having a synchronization function. The condition field records a duration in which the at least one subprocess continuously occupies a central processing unit, or the number of times that the at least one subprocess continuously occupies the central processing unit According to above-mentioned contents, the timing control method and system of the present invention can be applied on the network simulator platform and mark the subprocess entering the blocking I/O, so that the kernel can detect whether the subprocess occupies the resource, and inform the network simulator about the status of the subprocess through the notification event, thereby stopping execution of the simulator timer, to prevent the simulation time from forwardly shifting continuously in the network simulator pause duration; furthermore, when the subprocess continuously occupies the resource for a long time, no matter whether the subprocess issues the function or process of the timer event, the kernel can detect the status of the subprocess according to the mark status, and further notify the network simulator, so that the network simulator can determine, by itself, when to force the at least one subprocess to release the resource, thereby solving the problem that the simulator fails to execute because the subprocess continuously calls the system call or CPU-bound process, or executes an empty busy loop to cause failure of the virtual time to forward shift. As a result, the simulation timing of the network simulator can operate normally.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A timing control method, applied on a network simulator platform, wherein a network simulator is installed in a computer and configured to simulate at least one target software, and the timing control method comprises:
   when at least one subprocess calls a first system call to enter a blocking I/O, performing a marking operation;
   when a kernel detects that the at least one subprocess enters the blocking I/O, issuing a first notification event to inform the running network simulator that a status of the at least one subprocess is changed, and request the running network simulator to pause until the at least one subprocess leaves the blocking I/O; and
   when the kernel detects that all of the at least one subprocess leaves the blocking I/O already, issuing a second notification event to the network simulator, so that the network simulator continues to operate.

2. The timing control method according to claim 1, further comprising:
   when the network simulator pauses, the network simulator stops execution of a simulator timer, and after all of the at least one subprocess leaves the blocking I/O already, the network simulator is operated again and continues to execute the simulator timer.

3. The timing control method according to claim 1, further comprising:
building a task list managed by the kernel, wherein the task list marks a status of the blocking I/O after the subprocess calls the first system call.

4. The timing control method according to claim 3, wherein the task list comprises a condition field which is marked by a fourth system call, and the fourth system call belongs to a blocking I/O class or a Unix domain socket class, and the blocking I/O class comprises the system call having a function of opening file, reading file, writing file, or obtaining a file status, or having a synchronization function.

5. The timing control method according to claim 4, wherein the condition field records a duration in which the at least one subprocess continuously occupies a central processing unit, or the number of times that the at least one subprocess continuously occupies the central processing unit.

6. The timing control method according to claim 1, further comprising:
calling a third system call when the at least one subprocess is ended, and marking the at least one subprocess as a status of leaving the blocking I/O.

7. The timing control method according to claim 6, wherein the network simulator issues a second system call, to make the kernel force the subprocess, which occupies resource of central processing unit, to release the resource.

8. The timing control method according to claim 3, wherein the kernel detects the task list, when the kernel detects that the at least one subprocess continuously occupies resource of a central processing unit, the kernel issues a third notification event to the network simulator, so that the network simulator determines when to force the at least one subprocess to release the resource of the central processing unit.

9. A timing control system applied on a network simulator platform, comprising:
a network simulator installed in a computer and configured to simulate at least one target software;
at least one subprocess, wherein when the network simulator and the at least one subprocess use the same resource and the subprocess calls a first system call to enter a blocking I/O, a marking operation is performed; and
a kernel, wherein when detecting that the at least one subprocess enters the blocking I/O, the kernel issues a first notification event to inform the running network simulator that a status of the at least one subprocess is changed, and request the network simulator to pause, so that the at least one subprocess entering the blocking I/O uses the resource by turns, and when the kernel detects that all of the at least one subprocess leaves the blocking I/O already, the kernel issues a second notification event to the network simulator, so that the network simulator continues to operate.

10. The timing control system according to claim 9, further comprising a simulator timer, wherein when the network simulator pauses, the network simulator stops execution of the simulator timer, and after all of the at least one subprocess leaves the blocking I/O already, the network simulator is operated again and continues to execute the simulator timer.

11. The timing control system according to claim 9, further comprising a task list managed by the kernel and configured to mark the status of the blocking I/O after the subprocess calls the first system call.

12. The timing control system according to claim 11, wherein the kernel detects the task list, when the at least one subprocess continuously occupies a resource of a central processing unit, the kernel issues a third notification event to the network simulator, so that the network simulator determines when to force the at least one subprocess to release the resource of the central processing unit.

13. The timing control system according to claim 12, wherein the network simulator issues a second system call, to make the kernel force the subprocess, which occupies the resource of the central processing unit, to release the resource of the central processing unit.

14. The timing control system according to claim 11, wherein the task list comprises a condition field which is marked by a fourth system call, the fourth system call belongs to a blocking I/O class or a Unix domain socket class, and the blocking I/O class comprises the system call having a function of opening file, reading file, writing file or obtaining a file status, or having a synchronization function.

15. The timing control system according to claim 14, wherein the condition field is configured to record a duration in which the at least one subprocess continuously occupies a central processing unit, or the number of times that the at least one subprocess continuously occupies the central processing unit.

16. The timing control system according to claim 9, wherein the at least one subprocess calls a third system call when the at least one subprocess is ended, and the at least one subprocess is marked as a status of leaving the blocking I/O.

* * * * *